US012645770B1

(12) United States Patent
Barner et al.

(10) Patent No.: US 12,645,770 B1
(45) Date of Patent: Jun. 2, 2026

(54) DYNAMIC LOCATION-BASED SYNTHETIC SECURITY AUTHENTICATION SYSTEM AND METHOD

(71) Applicant: UIPCO, LLC, San Antonio, TX (US)

(72) Inventors: Robert Wilson Barner, San Antonio, TX (US); Sydney Ann Conrad-Cook, Van Meter, IA (US); David Joaquin Harris, San Antonio, TX (US); Nikhil Jog, Chandler, AZ (US); Roberto Virgillio Jolliffe, III, San Antonio, TX (US); Brian Howard Katz, San Antonio, TX (US); Nickolaus Wayne O'Neal, Adkins, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 35 days.

(21) Appl. No.: 18/931,675

(22) Filed: Oct. 30, 2024

Related U.S. Application Data

(60) Provisional application No. 63/594,792, filed on Oct. 31, 2023.

(51) Int. Cl.
$\quad$ G06F 21/31 $\quad\quad$ (2013.01)
$\quad$ G06F 21/62 $\quad\quad$ (2013.01)
(52) U.S. Cl.
$\quad$ CPC .......... G06F 21/31 (2013.01); G06F 21/6209 (2013.01)
(58) Field of Classification Search
$\quad$ CPC .............................. G06F 21/31; G06F 21/6209

USPC ................................................................. 726/6
See application file for complete search history.

(56) References Cited

U.S. PATENT DOCUMENTS

| | | | |
|---|---|---|---|
| 12,008,621 B1 * | 6/2024 | Atef ...................... | G06F 16/953 |
| 12,354,603 B1 * | 7/2025 | Lee ......................... | G06F 40/56 |
| 2008/0146193 A1 * | 6/2008 | Bentley .............. | H04L 63/0853 |
| | | | 455/411 |
| 2013/0013931 A1 * | 1/2013 | O'Hare ................. | H04L 9/3231 |
| | | | 713/189 |
| 2024/0039905 A1 * | 2/2024 | Talavera ................. | G06F 16/25 |
| 2024/0146734 A1 * | 5/2024 | Southgate ........... | G06F 21/6227 |
| 2024/0152267 A1 * | 5/2024 | Weil ........................ | G06F 21/32 |
| 2025/0077238 A1 * | 3/2025 | Obando Chacon ... | G06F 40/284 |
| 2025/0077940 A1 * | 3/2025 | Cui ........................ | G06N 20/00 |
| 2025/0110949 A1 * | 4/2025 | Roychowdhury .... | G06F 16/212 |

* cited by examiner

*Primary Examiner* — Badri Narayanan Champakesan
(74) *Attorney, Agent, or Firm* — Plumsea Law Group, LLC

(57) ABSTRACT

A method and system for dynamically generating custom location-related queries for authentication and access management. The embodiments provide a system that authenticates users of secured resources regulated by computing device such as ATM and payment terminals by requiring a correct response to a question about the user's recent location activity. Where the system determines the user has provided the correct response, a verification signal approving the request is transmitted from the system to the access management system regulating access to the secured resource, causing the processing of a payment or release funds, or otherwise grant access to the desired secured resource.

20 Claims, 14 Drawing Sheets

DYNAMIC LOCATION-BASED SYNTHETIC SECURITY AUTHENTICATION SYSTEM AND METHOD

CROSS-REFERENCE TO RELATED APPLICATION

This application claims the benefit of U.S. Provisional Patent Application Ser. No. 63/594,792 filed on Oct. 31, 2023 and titled "Dynamic Location-Based Synthetic Security Authentication System and Method", the disclosure of which is incorporated by reference herein in its entirety.

TECHNICAL FIELD

The present disclosure generally relates identity authentication, and specifically to a method and system for authentication of persons seeking access to one or more secured services, features, and resources. The authentication is based on responses to queries presented using the person's location data.

BACKGROUND

Organizations may provide authorized end-users with various secured services or resources via multiple communication channels. Examples of such channels include modes of communication (e.g., a communications network) for exchanging data between devices, where such devices may include, but are not limited to, computing devices, such as tablets, personal computers, and smartphones; point of sale devices; ATMs; connected smart devices, such as refrigerators, watches, and laptops; telephones, such as landline telephones or mobile phones; electronically locked spaces managed by computer user interfaces, such as safe deposit box chambers, lockers, cars, offices, homes; and face-to-face contacts, such as interaction between a user and an employee of the organization. Channels may also include software and firmware associated with the devices and communications devices, such as web portals, applications, networks, mobile applications, and instant messaging systems. Channels may also include hardware associated with the computing devices and telephones, such as the network hardware, credit card scanners, and retinal scanners.

In most scenarios in which an end-user attempts to access a secured resource via one or more of these channels, the end-user will be required to provide some proof of identity, typically associated with an identification card, key-card, fingerprint, or other factor before access is granted. Personal computers (computing devices) pose additional complexities in authenticating users. Computing devices are commonly used by more than one person. It is generally not safe to assume that the identity of the computing device satisfies the ownership factor. Additionally, computing devices have been more easily compromised than other devices. Current solutions increase security, but are often inconvenient for users. More recently, the threat of video forgery (e.g., deep fakes) have increased concern that image data of an end-user may not be authentic.

Thus, authentication (i.e., identifying and verifying) of an end-user can be time-consuming for both the end-user and the organization, as well as burdensome for users who are required to carry and present the necessary identification credentials and/or keys, or memorization of passwords or codes. It may be appreciated that many businesses and other organizations would benefit from mechanisms by which to reduce the costs associated with the authentication and authorization of customers. Furthermore, customers will be attracted by an authentication system that reduces or even eliminates the need to carry or remember multiple unique identification factors, as well as a system that significantly improves account security.

There is a need in the art for a system and method that addresses the shortcomings discussed above.

SUMMARY

In one aspect, a computer-implemented method of authentication for access to a secured resource is disclosed. The method includes a first step of collecting, via an authentication application for a user computing device, first location data for a first person over a first period of time, and a second step of transmitting, from the authentication application, the first location data to an authentication system. A third step includes receiving, at the authentication application and from the authentication system, a first query based on the first location data, and a fourth step includes presenting, via the authentication application, the first query. In addition, a fifth step includes receiving, at the authentication application and from the first person, a first response to the first query, and a sixth step includes transmitting, from the authentication application and to the authentication system, the first response. Furthermore, a seventh step includes receiving, at the authentication application and from the authentication system, a verification signal that triggers a grant of access to a secured resource via the user computing device.

In another aspect, a computer-implemented method of authentication for access to a secured resource is also disclosed. The method includes a first step of receiving at a first time, at an authentication system and from an access management system for a secured resource, a request for an authentication factor, and a second step of presenting, in response to the request and via a user computing device carried by a first person, a first query generated by a large language model (LLM) of the authentication system, the first query based on first location data collected by the user computing device. A third step includes receiving, at the authentication system and from the user computing device, a first response to the first query, and a fourth step includes determining, at the authentication system, the first response corresponds to a correct answer. In addition, a fifth step includes authenticating, in response to determining the first response corresponds to the correct answer, the first person, and a sixth step includes transmitting, from the authentication system, a verification signal to the access management system that triggers a grant of access to the secured resource for the first person.

In another aspect, a system for authentication is disclosed. The system comprises a processor and machine-readable media including instructions which, when executed by the processor, cause the processor to: (1) collect, via an authentication application for a user computing device, first location data for a first person over a first period of time; (2) transmit, from the authentication application, the first location data to an authentication system; (3) receive, at the authentication application and from the authentication system, a first query based on the first location data; (4) present, via the authentication application, the first query; (5) receive, at the authentication application and from the first person, a first response to the first query; (6) transmit, from the authentication application and to the authentication system, the first response; and (7) receive, at the authentication application and from the authentication system, a verification signal that triggers a grant of access to a secured resource via the user computing device.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1A:
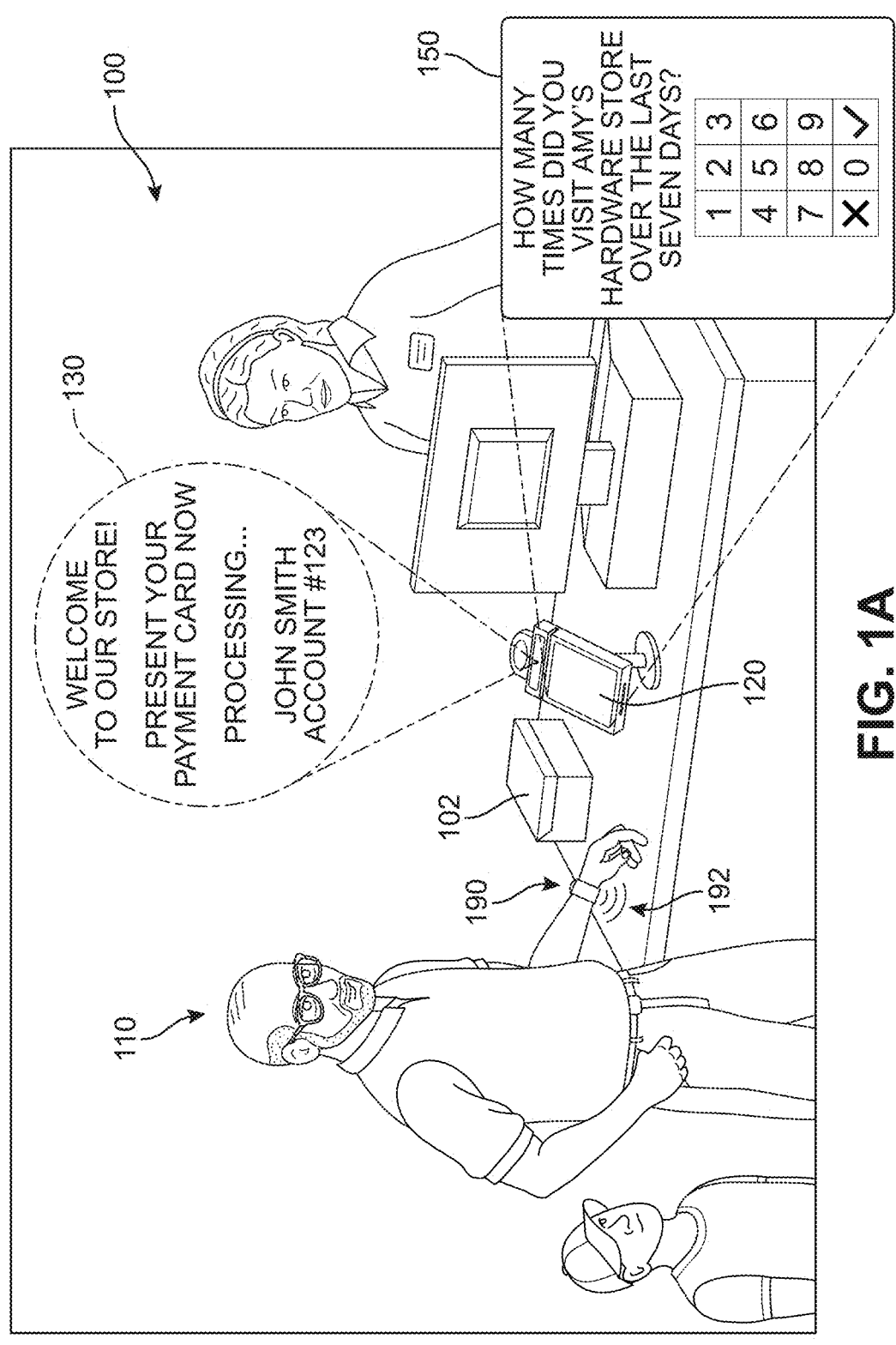
FIGS. 1A and 1B depict an example of a first person using an payment terminal and providing an authentication factor by answering a location-based query, according to an embodiment.

The embodiments provide a method and system of authenticating users for access to secured resources in a more secure and efficient manner using synthetically generated questions based on the user's location data. In some embodiments, the system can automatically mine the user's past location information and use that information to generate synthetic security questions that can be used for authentication. In one example, the location information is collected via a GPS sensor or other location tracking sensor in their mobile computing device (e.g., mobile phone, or a smart wearable device). This data can be pulled into an authentication application ("app"), which can retrieve specific information about locations where the user has recently been/visited, or patterns of location-related behavior. The app may also retrieve various kinds of information related to the locations (for example, determining that one location is the user's home, another is a restaurant). In some embodiments, the location information can then be fed to a large language model (LLM) which can digest the information and generate novel synthetic security questions, such as "Which restaurant did you visit three times this week?". As part of this process, the LLM may also generate an associated answer based on the collected location data. Once the user is prompted with a question and provides a response, the LLM may be used to interpret the response and confirm it is reasonable given the expected answer that was earlier generated by the LLM. This second step can help ensure the authentication system is not overly rigid in the type of response it will accept as an answer.

In addition, in some cases, the LLM could also access additional information, for example news or other exterior information to formulate more creative and difficult questions. For example, the LLM could, upon receiving information about a user visiting a particular restaurant, check for any news about that restaurant and formulate a question related to the news event rather than the restaurant itself. In different embodiments, the LLM could generate questions with varying levels of difficulty. The difficulty of the question asked to the user could then be determined based on other measures of trust, for example, when the user is at home and makes a request for access to a secured resource, the system may have additional trust that it is the user and the security question may be less difficult.

It can be appreciated that such a system would offer significant benefits, particularly to the elderly or others for whom carrying of tokens and/or recall of complex passwords may be challenging. This system can be used to authenticate purchases as well as ATM sessions, or other requests to access secured resources. In some embodiments, the user interface for the app can present a set of selectable options or a free-response box that allows the user to select the correct answer from a list of multiple-choice options or type in their response to the question. The app could record the responses, and if correct, this would serve as a two-factor authentication code (e.g., in addition to the presentation of some other token, such as a debit or credit card). In one example, the system can create the queries based on the user's prior visits to specific types of locations (e.g., grocery stores, movie theater, schools, etc.) as well as merchant locations (e.g., "Jimmy's Hamburgers", "Cats and Kittens Coffee Shop", etc.). Furthermore, in different embodiments, the queries and their associated response options can be dynamically created by the system so there is no or little repetition. In other words, because the user's location will invariably change from day to day, the system questions may be the same but the correct answer will be different depending on the user's recent movements.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity or source of identity, and typically occurs when subjects provide appropriate credentials to prove their identity. For example, when a user provides the correct password with a username, the password proves that the user is the owner of the username. Thus, the authentication provides proof of a claimed identity. In the embodiments described herein, authentication of an image based on the detection of a specific output in the image can be used to prove the user is the owner of the username. As a general matter, three main methods of authentication include (a) user knowledge, such as a password or PIN; (b) user possession, typically provided by the secured system, such as a key, smart card, CAC (Common Access Card), PIV card (Personal Identity Verification card), RSA, or other card or token, magnetic stripe cards, certificates with a digital signature, computing device that is configured to receive a control signal, etc.; and (c) biometric factors, such as voice recognition, facial recognition, retinal and fingerprint scans, etc.

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The term "passive" refers to the concept of a system and method that is not dependent on any particular 'active' interaction of a person with a device resulting from a change in the person's normal activity or behavior and/or do not require the user to remember anything. In other words, walking and moving their body (e.g., adjusting the position of their arm) from one location to another are passive interactions, as the person would perform these activities regardless of the authentication system that is in place. However, other user actions, such as but not limited to providing a passcode, security question answers, etc. are active inputs and a system requiring any of these types of information would not be considered passive. In addition, this type of arrangement—relying on wearable secondary devices—precludes the need to previously record and store any biometric data (e.g., retinal scan, fingerprint scan, voice-print, etc.) for the user, which some users are uncomfortable doing.

Figure 1B:
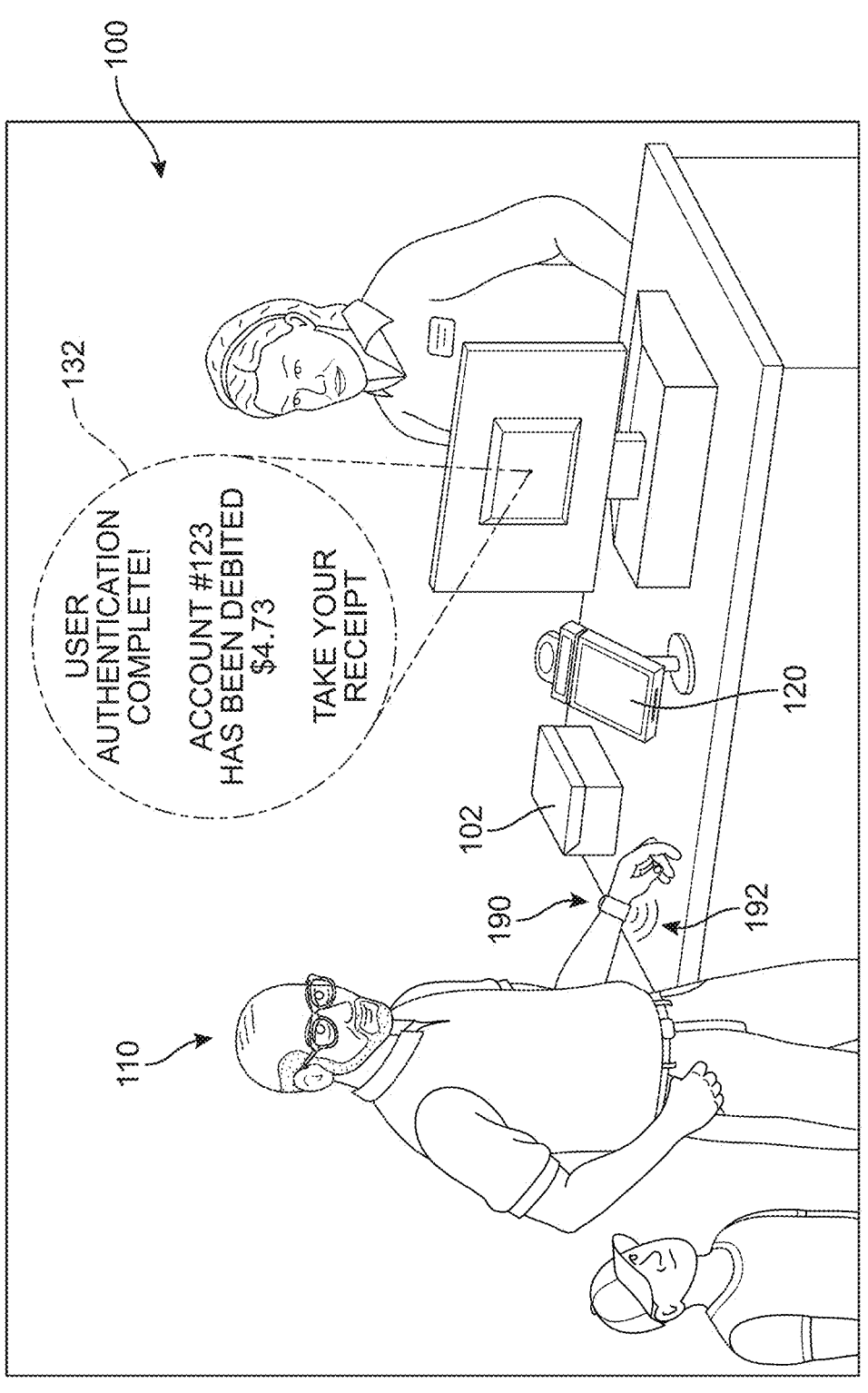

For purposes of introduction, an overview of one embodiment of the proposed systems and methods is illustrated with reference to FIGS. 1A and 1B. In FIGS. 1A and 1B, an example of an authentication process is shown in which a first user 110 is at a merchant check-out station 100 indicating an intention to purchase an item 102. The first user 110 scans his payment card at a payment portal device 120 (or point of service POS terminal), which is accepted per a first message 130 presented on a display of the payment portal device 120. Once the account for the first user 110 has been identified ("John Smith/Account #123), a communication between the payment portal device 120 and a remote authentication system can cause transmission of a control signal to the payment portal device 120, which now presents a first synthetic query 150 ("How many times did you visit Amy's Hardware Store over the last seven days?").

It should be understood that the question that is shown was created based on location data 192 that has been collected for first user 110, for example via a smartwatch 190 worn by the first user 110. The location data is used to generate the question, and the question can then be transmitted to the payment portal device 120 for presentation. However, in other embodiments, the smartwatch 190 itself can present the authentication question instead, and rather than the content of the question and/or response being communicated to an external device, the data remains at the user's device, and only an authentication control signal is provided to the payment portal device 120 when the user submits the correct answer. Turning to FIG. 1B, the first user 110 has inputted his response (e.g., "4") at the payment portal device 120, which in turn completes authorization of the first user 110 and completes the payment process, as shown in a second message 132 presented on the display ("User authentication complete!/Account #123 has been debited $4.73/Take your receipt").

Thus, in different embodiments, an access management system for the payment portal device 120 can, in response to the signal from the remote authentication system and/or the app running on smartwatch 190, release or authorize access to the resource (e.g., account funds). In FIG. 1B, without further action or presentation of credentials by first user 110, the payment event can proceed with permitting first user 110 access to the account linked to the authenticated identity of the first user 110. The first user 110 is then able to pay for their item 102. This exchange takes place with the first user 110 appreciating that only they had the requisite location knowledge of where they had been over the last seven days and how often they had visited the selected site (Amy's Hardware) that would allow them to answer the synthetically generated query, preventing or at least significantly reducing the likelihood of others from using their payment card to make fraudulent transactions.

In different embodiments, it can be understood that the computing device by which the user is authenticated (e.g., smartwatch 190, payment portal device 120, etc.) can include an electronics unit comprising a plurality of different components, such as one or more of various user interface components (e.g., an augmented reality display, microphone, camera, speaker, etc.), a user interface module, a processor, and/or a communication module. These devices may include a system including one or more processors and memory. Memory may comprise a non-transitory computer readable medium. Instructions stored within memory may be executed by the one or more processors. Furthermore, the first user 110 may carry another type of mobile device that can collect location data. Such user devices may be configured to receive and analyze data from various input sensors associated the device or data that is communicated from external components or devices to the device. In some cases, these devices may also include a navigation system equipped with a GPS receiver that can receive GPS information or other receivers capable of receiving global or local positioning information.

In addition, in some embodiments, a communication module may allow the smartwatch 190 or other use device to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In different embodiments, the smartwatch 190 or other user device may include a device display ("display") that can, for example, present information and various media for a software application ("app"). In some embodiments, the app is associated with the service that provides security for the resource that the user is trying to access. In some embodiments, the first user 110 can receive and send information through a user interface that may be presented on a display for the smartwatch 190. In some embodiments, the display may be a virtual/touchless touchscreen, allowing the customer to interact with the user interface directly by tapping virtual objects and recognizing these taps as selections. The user interface may further refer to an operating system user interface or the interface of one or more software applications that may run on the smartwatch 190. In some embodiments, the user interface can include a messaging window or other chat-space by which the first user 110 may send messages or other digital content to/from the authentication system.

While in some embodiments the system may incorporate additional layers of authentication that may supplement the authentication process, such as facial recognition, voice recognition, fingerprint recognition, password or pin-code verification, or other such factors, it may be appreciated that the system can be readily implemented without such additional steps. In other words, the first user 102 is able to obtain access to the desired secured resources without any other identification card, debit card, or other system-provided token typically presented for such occasions. The system thereby allows the user to be passively (i.e., 'touchlessly') authenticated.

Figure 2A:
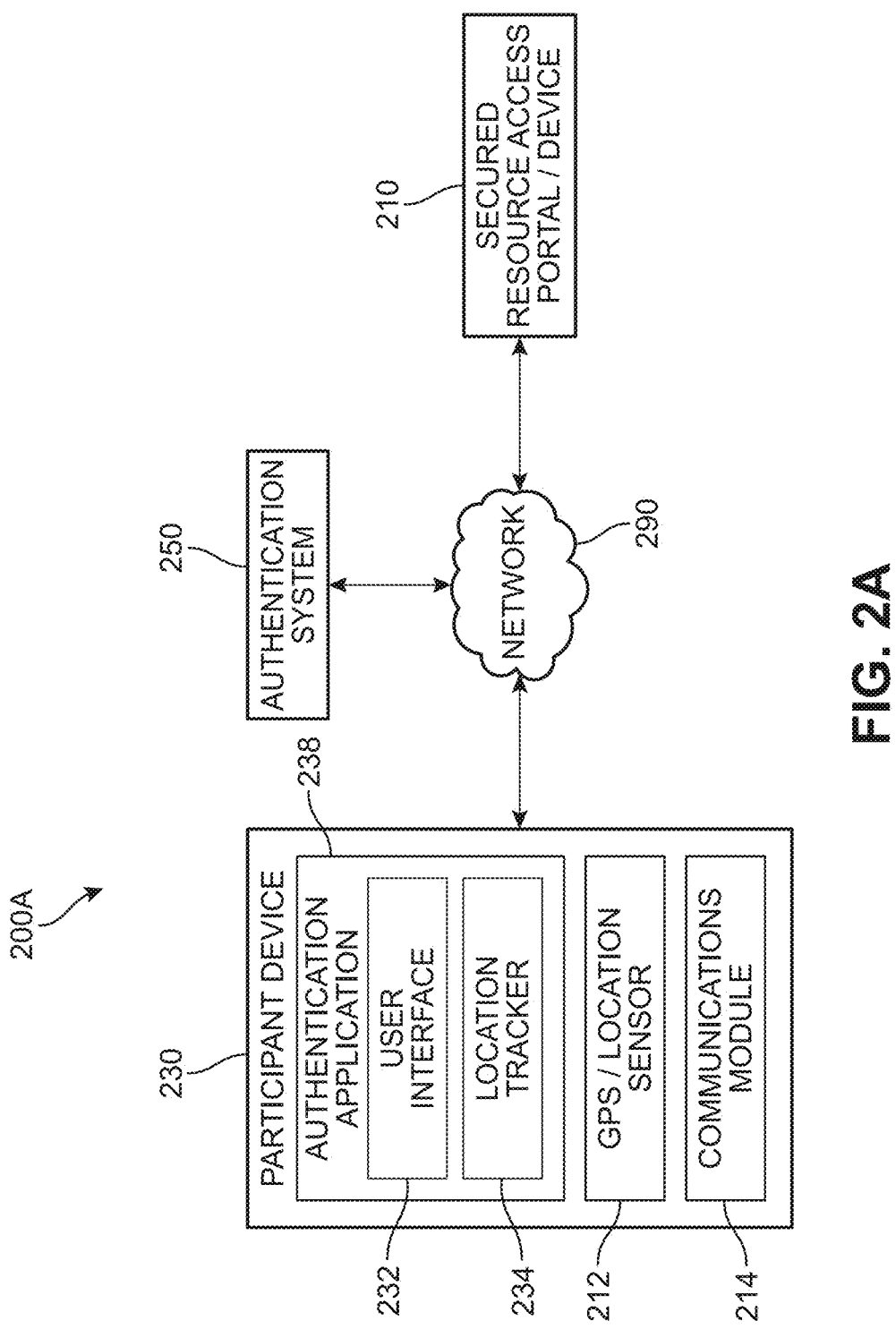
FIGS. 2A and 2B are schematic diagrams of an environment for an authentication system that generates queries based on a person's location data, according to an embodiment.
Figure 2B:
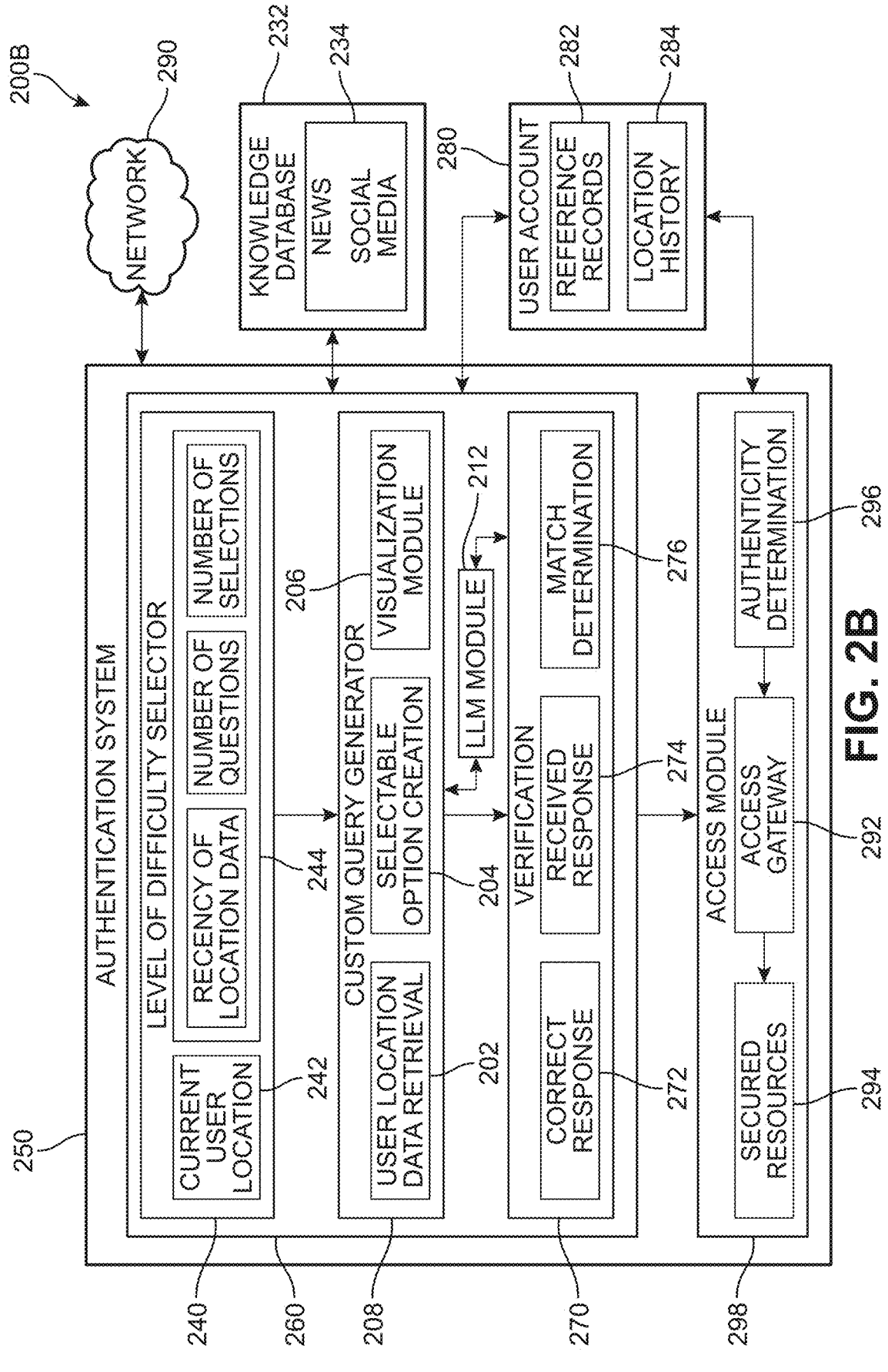

In order to provide the reader with a greater appreciation of the embodiments, FIGS. 2A and 2B together depicts an overview of an embodiment of an environment (200A, 200B), referred to herein for purposes of simplicity as environment 200, for implementation of an authentication system in which responses to questions based on each individual users' location are used to determine an authenticity of the user. FIG. 2B presents an expanded view of an embodiment of an authentication computing system ("system") 250 that is introduced in FIG. 2A. It should be understood that the environment 200A, 200B is presented is for purposes of illustration only, and other embodiments may utilize different or additional components or processes. The environment may alternatively include additional, fewer, or different components. For example, the environment may include additional storage devices, additional servers, additional computing devices, and other features not shown in FIGS. 2A and 2B.

As shown in FIG. 2A, the environment 200 can include a participant computing device ("participant device") 230. The participant device 230 can be configured to communicate with a payment processing/ATM computing device ("payment device") 210 or other device/portal for a secured resource access system, for example via a Wi-Fi, cellular, or other network connections 290. The networks 290 may comprise any number of electronic devices and use any number of communication protocols to facilitate data communications within the network 290. One having skill in the art would appreciate that the network 290 may include a variety of internal and/or external networks 290 of various types implementing various data communications technologies. The communication over the network may be performed in accordance with various communication protocols such as Transmission Control Protocol and Internet Protocol (TCP/IP), User Datagram Protocol (UDP), and IEEE communication protocols. The networks 290 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 290 may include a physical and/or logical architecture defined by firewalls, proxy servers, routers, switches, or similar features that implement various levels of security and my function as logical gateways or boundaries.

In the embodiment of FIG. 2A, the participant device 230 further includes a communication module 214 for transmitting and receiving data over a network. Furthermore, the participant device 230 can be understood to include a GPS or other location sensor 212, which can collect location data that is monitored and recorded by a location tracker 234 for an authentication app ("app") 238 and shared with the authentication system 250. In some embodiments, notifications reminding the user that their location is being monitored can also be generated at user interface 232 when the location tracker 234 is tracking their location.

While some of the various components of the environment are shown as being accessed through a cloud network and/or stored on a cloud-based server in FIGS. 2A and 2B, in other embodiments some or all components or modules described herein can reside in participant device 230 and/or payment computing device 210. Thus, in different embodiments, authentication system 250 or components thereof can be hosted on a server and accessed remotely by the payment computing device 210 and/or participant device 230 and/or HMD system 220, or be stored fully or partially as local instances on the participant device 230 and/or payment computing device 210. For purposes of this application, the term "computer system" refers to the computing resources of a single computer, the partial computing resources of a single computer, a plurality of computers communicating with one another, or a network of remote servers. In one embodiment, computer system includes at least one server having at least one processor.

In different embodiments, the participant device 230 can also include a device display ("display") that can present information and media, for example for the authentication application ("app") 238 that can allow for a secure transmission of data between the (wearable or mobile) participant device 230 and the payment device 210. For example, a customer can receive and send information through a user interface 232 for app 238 that may be presented on the device display. Although the app 238 is shown as residing on participant device 230 in FIG. 2A, it should be understood that the app 238 or aspects thereof can be a web-based application that is accessed from a device over network 290, or can be stored on the secured resource access device itself.

In different embodiments, the user interface 232 and display may represent a common component or may represent separate physical or functional components. In some embodiments, the display may be a touchscreen, allowing the customer to interact with the user interface directly by touch. The user interface may refer to an operating system user interface or the interface of one or more software applications that may run on the participant device 230. In addition, in some embodiments, when the user launches the app 238 on participant device 230, they may be shown an option to initiate the presentation of authentication content related to a pending request by the user for secured resource access. In addition, the app 238 (running on either participant device 230 or payment computing device 210) can include additional components enabling features by which control signals received from the authentication system may be executed. In other embodiments, the components can be configured as a simple software execution mechanism which receives, translates, and presents output in response to signals transmitted by the authentication system 250.

Moving to FIG. 2B, it can be seen that the synthesis of a query can occur via a dynamic query authentication module 260. In some embodiments, the dynamic query authentication module 260 can begin its process of dynamic query generation by performing a lookup function or retrieval of user data (user location data retrieval 202), for example from a user accounts database ("database") 280. In different embodiments, the database 280 can be external to the authentication system 250, or can be included as a component of the authentication system 250. In some embodiments, a user's recent location history 284 and/or reference records 282 can be shared with a custom query generator module 208 and used by a selectable option creation module 204 to process and curate the user-specific information. For example, location history 284 may include the user's recent location history data (up to the point in time that the user made the request for access) associated with their mobile device or other wearable computing device with a location sensor that has the authentication app installed to track and pinpoint the user's movement from one location or site to another. In addition, the custom query generator module 208 has access to, or can receive, a set of user-specific data harvested from reference records 282, such as their recurring or frequently visited locations (e.g., their home, school, work, preferred grocery store, bank) that may represent specific sites or relatively stable/consistent data reference points. In other words, data from reference records 282 may not be as variable as the data harvested from the location history 284.

Thus, in different embodiments, the custom query generator module 208 can take advantage of user-specific information that is valid only in a recent/short-term manner (e.g., what was the last gas station you visited?) as transient data, as well as information that is more stable and is valid over a longer span of time (e.g., when did you last visit Orlando?). The transient data can be more low-level and nuanced, making it much harder for a third-party to guess, but recent enough that it is simple for the actual user to recall, while the stable reference data can be more high-level because a user cannot be expected to recall trips that occurred months or years ago unless related to significant 'once-in-a-blue-moon' vacations or events that would cause the purchase to be memorable for the user.

In order to make sense of the user's location history and transform the data into user-friendly queries for purposes of authentication, a large language model (LLM) module 212 can process the information provided by the user account 280, including their location history 284. An LLM of the LLM module 212 can identify each instance where the user stopped for longer than a specific duration (e.g., longer than 10 minutes, longer than 30 minutes) to ensure the stop was memorable for the user. In some embodiments, the LLM can identify patterns, such as routes that are regularly traveled (e.g., home—school—home/home—work—home/home—work—school—home/home—parent's home—work—parent's home—home, etc.). In addition, the LLM can track the frequency of the user's visits to specific merchants or locations, how long the user spent at each location, how far the location was from home, and whether they drove to a location, walked, or took public transport. With this information, the LLM can generate one or more synthetic security questions for presentation via the custom query generator module 208, as well as define values for any correct response, and in some cases, possible values for incorrect responses that may be used when the query is shown in a multiple-choice format. Furthermore, in different embodiments, the LLM can work with the verification module 270 to evaluate "fill-in" or free-write responses from the user to ascertain whether they sufficiently represent or correspond to a correct answer and increase answer tolerance (the breadth of responses that may be interpreted as "correct"). For example, when requesting the user identify a store name as their most recently visited grocery store "Hanson's", the user might inadvertently spell the answer as "hansoms". The LLM could assess the level of similarity (e.g., one letter off), remove the requirement for a grammatically correct wording (e.g., no apostrophe or capitalization), as well as whether the inputted response, when spoken aloud, has a sufficiently similar sound to the correct answer. Thus, rather than force the user to enter a static, no error response, the LLM can determine whether the submitted answer is within a particular similarity range or threshold of the correct answer when determining whether it is accurate and can be deemed a "correct" response for purposes of verification.

In different embodiments, once the selectable options have been created by custom query generator module 208, a visualization module 206 can prepare the queries and pass the security factor request to the participant device and/or secured resource access device (shown in FIG. 2A). The request, including a visualization data packet, can cause the display of the device to present a plurality of options, including incorrect options appropriate/feasible/related to the question, for the user to interact with (e.g., see FIGS. 8, 9A, and 9B). Once the user submits their responses, the data is reviewed by the LLM and the LLM's evaluation is passed back to the verification module 270. If verification module 270 confirms the user's inputs (received response 274) match a correct response 272 as defined by the LLM module 212, a match determination module 276 can generate a verification signal that is received by an access module 298.

Furthermore, in some embodiments, the authentication system 250 can apply/require a difficulty level to the synthetic questions generated by the LLM module 212 based on the same set of user past/recent location data. For example, in some embodiments, the level of difficulty (challenge) associated with the question can vary based on a current location of the user ("current user location") 242, as obtained via the user's computing device, at a level of difficulty selector module 240. In cases where the user is at "home", the security threshold may be relatively lower, and so the challenge of the question may be similarly low. In contrast, if the user location indicates they are out of town, the security threshold may be relatively higher. In still another example, if the user location indicates they are at one location and then within a too-short time frame suddenly at a different location (e.g., they were at home, and now suddenly/within a few minutes they are 20 miles away), there may be a higher level of difficulty still. In other words, the more likely a user is to be at their current location (based on their past location history), the less difficult the question, while the less likely the user is to be at the current location (based on their past location history or any aberrations in their location activity), the more difficult the question will be. In different embodiments, the level of difficulty can be instead or also based on the type of secured resource to which access is being requested. In this approach, the user may designate—or the system can default identify—some low-risk secured resources (e.g., utilities payment apps/login portals, fast-food apps, or other low security resources that would not damage the user significantly if access were fraudulently obtained by a third party) to involve synthetic questions with low levels of difficulty. In addition, the user could designate or the system can default identify some high-risk secured resources (e.g., banking apps, healthcare records access, retirement funding accounts, credit card apps, etc.) to require synthetic questions of relatively higher levels of difficulty. In another example, all access points may require questions of the highest level of difficulty or an intermediate level of difficult as a default, and the user could manually select which types of access should be re-assigned to low challenge levels, and which should be maintained at high challenge levels.

For purposes of this application, the level of difficulty for a synthetic query refers to the likelihood that someone other than the authorized user could answer the synthetic question with their own personal knowledge, or a random guess. Thus, synthetic queries with low levels of difficulty would potentially be answerable by family members of the user, or someone else close to the user, or could even be a "lucky guess". On the other hand, synthetic queries with high levels of difficulty would potentially be only answerable by the authorized user, and may even require some consideration or contemplation by the user before they can provide a response.

Some possible features of a synthetic query that can cause a variation in the degree of difficulty (query features 244) can include, for example, the number of questions that are included in the query (e.g., one synthesized question about the user's recent location behaviors, two synthesized questions, three or more, etc.) that must be answered correctly before access will be granted, where the higher the number of questions, the more challenging the query, and the lower the number of questions, the easier the query.

In addition, the recency of the location data that is used as the basis of the question can also define how difficult the query will be. For example, synthetic questions about a place the user visited that same day may be presented in one case, while synthetic questions about a place the user visited weeks ago may be presented in another case. In this approach, the farther back in time (older) that the location data related to the question is, the more challenging the query, and the more recent to current time the location data that is used is, the easier the query.

As yet another example, the number of options that are shown as potential answers to a particular multiple-choice question synthetically generated by the LLM module 212 can also be used to modulate the degree of difficulty of that question. More specifically, if a question has two possible answers (yes/no) or a multiple-choice question only includes two options for the user to choose from, the level of difficult of that question will be considered low. However, as the number of options increases, so does the level of difficulty. In some embodiments, the number of options that are shown to the user can be increased to 3, 4, 5, or more answer options, up to the available presentation space of the device display. In some embodiments, the similarity of the other (wrong) answer choices can also be used to heighten the level of difficulty. For example, the LLM can custom generate a set of multiple-choice answers that are more nuanced and closer to the actual correct answer (e.g., podcast name of "Moving On With Your Life After A Divorce" can include a 'challenging' set of selectable options that are similar or related, such as "Moving On With Your Life After A Divorce", "Getting Through A Break-Up", "How To Deal With Loss", "When Spouses Separate", and "Letting Go Of Love", all automatically generated by the LLM to increase the level of difficulty, while an 'easier' set of selectable options can be more distinct/unrelated, such as "Moving On With Your Life After A Divorce", "Cats Are The Purr-Fect Pet", "Astronomy 101", "Dating In The Modern World", and "Astrological Signs of Romance").

Finally, in still another example, in some embodiments, the authentication system 250 can access some external sources of knowledge (e.g., knowledge database 232) that can provide supplemental information about some of the locations that the user has visited recently. For example, current event information services 234 (e.g., news, social media, etc.) can be scanned and harvested for keywords that would be directly related to a specific location the user was recorded as visiting. As noted earlier, the system could, upon receiving information about a user visiting a particular restaurant, check for any news about that restaurant and formulate a question related to the news event rather than the restaurant itself. In another example, if the user had just visited an amphitheater to see a musical performance, the LLM module 212 could access information from knowledge database 232 to ask the user to identify the name of the performer(s), which would be known to the user if they had indeed attended the event. Similarly, if the user had visited a playhouse, the LLM module 212 could access information from knowledge database 232 to ask the user to identify the name of one of the plays that were currently being performed there, which would be known to the user if they had indeed been at the playhouse. If the user had been tracked and noted by the system as having recently visited a museum, the LLM module 212 could access information from knowledge database 232 to ask the user to identify the name of one of the main exhibits, which would be known to the user if they had indeed entered the museum. Thus, in different embodiments, these four aspects of a question can be used individually or in combination to carefully modulate the level of difficulty of a question to provide stronger security when appropriate, while continuing to ensure the response is readily recall-able by the user.

In different embodiments, once the user is determined to have correctly answered the synthetic query, an authenticity determination module 296 of the access module 298 can receive the verification signal generated by the verification module 270 and authenticate the user. An access gateway 292 receives the authentication decision, and enables access to secured resources 294. In some embodiments, the verification signal can trigger one or more of the following responses in the computing device that is managing the security of secured resources 294: (a) enable the user to access their account information; (b) enable the user to access cash/funds from their bank account (e.g., via an ATM), or release cash from the dispenser of the ATM; (c) approving/unblocking the processing of the payment for the requested purchase (e.g., at a POS terminal); (d) enable access to a physical location through a secured/locked door by automatically unlocking the door, or automatically unlocking a compartment in which valuables/secured items are stored, (e) enable access to the secured electronic contents in a digital storage locker; (f) present an approval message to a third party indicating the user has been authenticated; and (g) enable access to a mobile app or portal. In other words, in different embodiments, the authentication system can generate a verification signal that is received by the computing system that manages access to the secured resource which in response to this signal can trigger or cause an access granting event.

Figure 3:
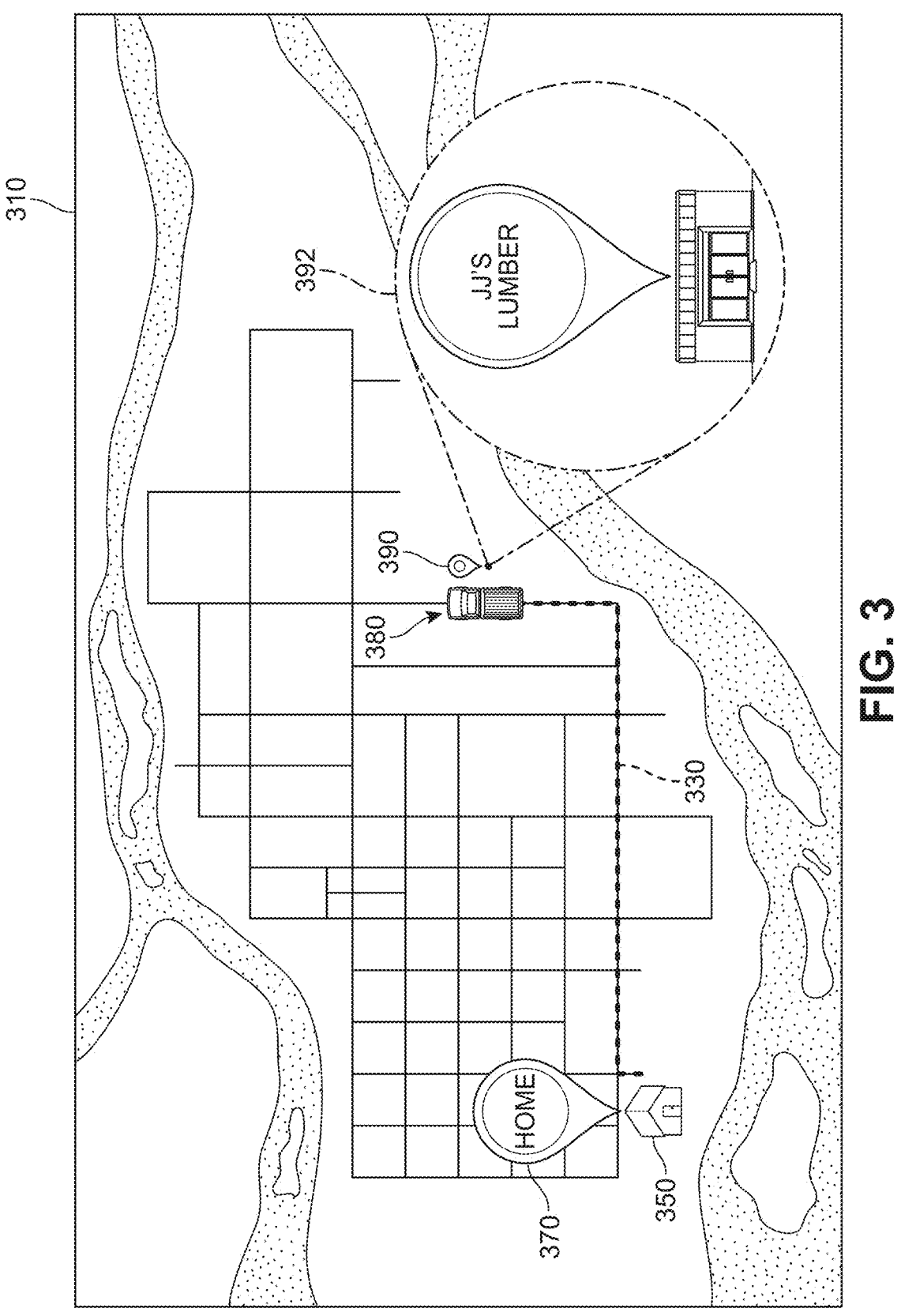
FIGS. 3, 4, 5, and 6 are examples of an authentication application installed on a user device monitoring a user's location for purposes of performing authentication at a later time, according to an embodiment.
Figure 4:
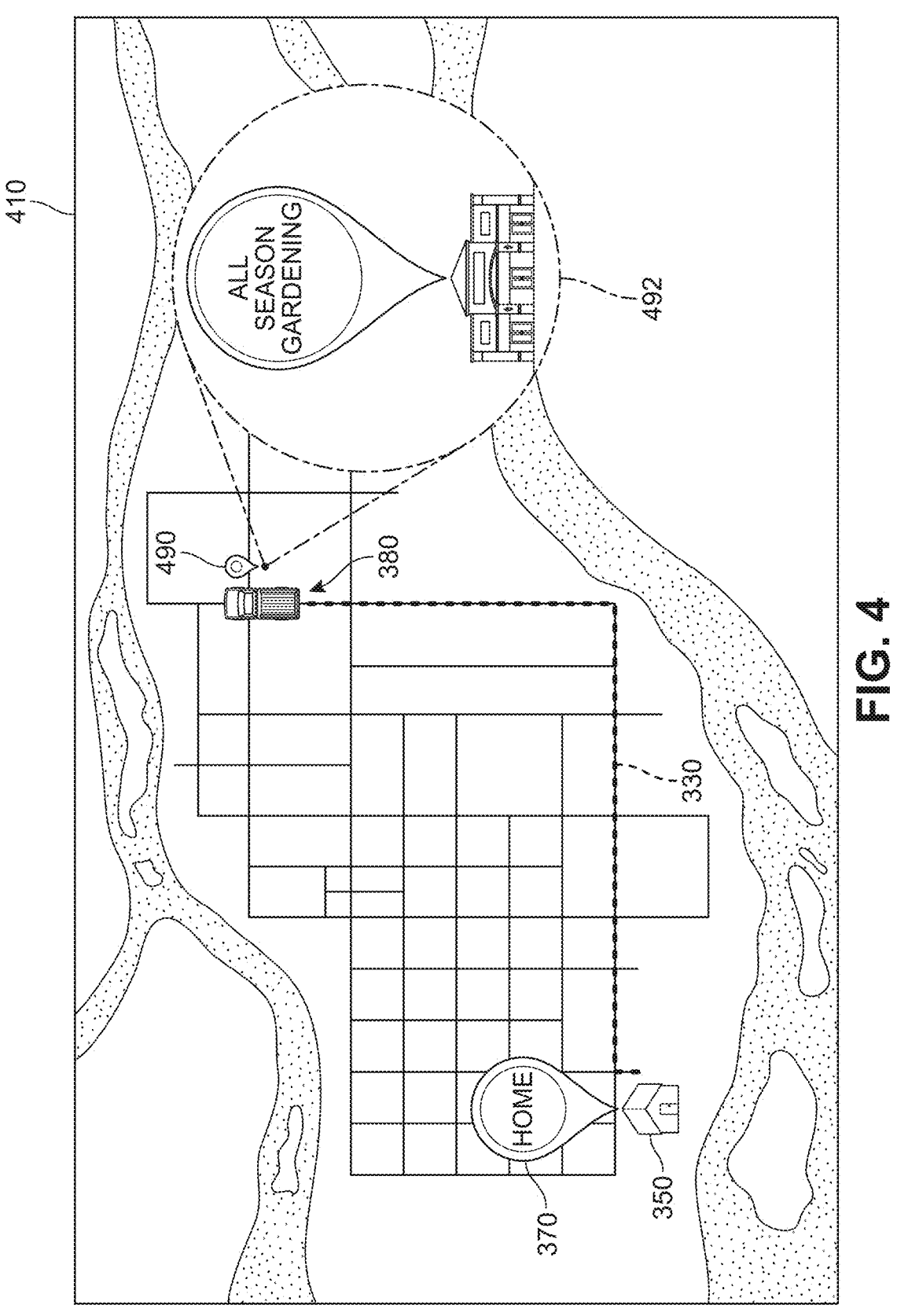
Figure 5:
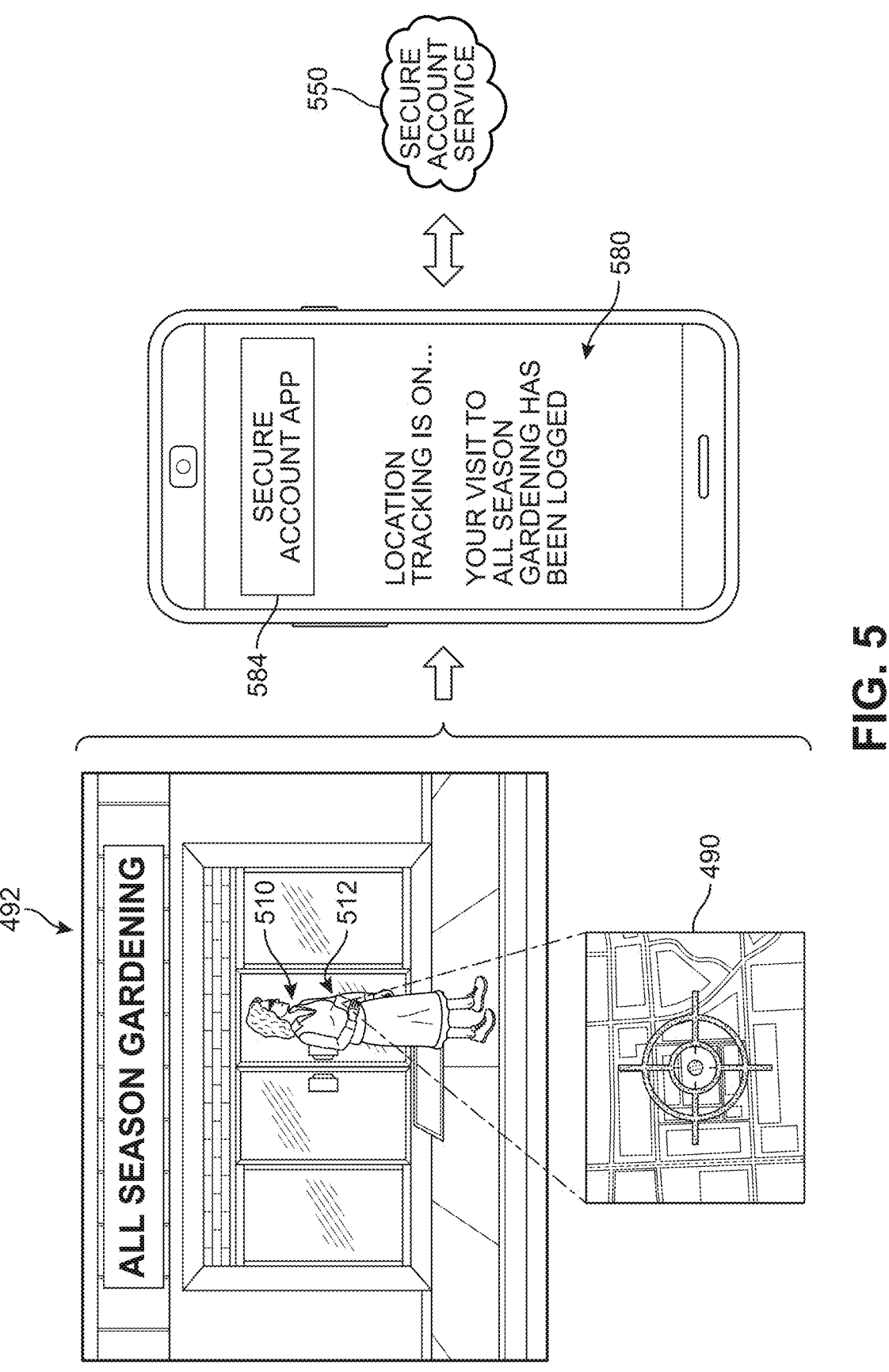

For purposes of illustration, an example location tracking and authentication process that may be provided by the proposed systems is now depicted in FIGS. 3-10. As noted earlier, in different embodiments, as a user travels from one site to another while carrying or wearing their mobile computing device, an authentication app installed on their device can track their movements and record location data for use by the authentication system. In FIGS. 3-5, a location tracking operation is illustrated, where a schematic map view is presented to reflect a route 330 of a vehicle 380 (driven by a system user) from their home 350 (recorded by the authentication system as first location data 370 that describes the location and the time/day) to a first destination 392 which can be labeled/recognized with reference to a location knowledge database by the name of the merchant or resource based at that location (e.g., "JJ's Lumber") and stored in the app/system and user account as second location data 390. The app detects that the user remains at this location for longer than a pre-designated duration (e.g., 5 minutes or more, or some other minimum time period) and registers this as a "stop" or "visit" and records the event as second location data 390.

In FIG. 4, the user returns to their vehicle 380 and continues along their route 330 to a second destination 492 (identified and tagged by the system as store/merchant "All Season Gardening"), and records third location data 490 for later reference. FIG. 5 depicts an elderly woman user 510 exiting the second destination 492 while holding her mobile device 512. Authentication app 584 can, in some embodiments, generate and present automated notifications 580 when the user stops at some location longer than the pre-selected duration to remind the user that their visits are being monitored and shared over a network 550 with the authentication system for later use (e.g., "Location Tracking is on . . . Your visit to All Season Gardening has been logged"). Thus, the app 584 can ensure the user is kept apprised of its activity and also provide feedback about the name of the location that the user's visit is associated with. In some embodiments, the app interface can permit the user to delete some of their location activity so that it is not recorded and cannot later be used as the basis of synthesized security questions. In another example, the app interface can permit the user to rename the location that was visited if they do not believe the designation automatically assigned by the system is correct, or they simply want to rename the location (e.g., rather than All Season Gardening, renaming the location as "My Fave Garden Store") so that when later questioned about this visit, the user's manually inputted label will be accepted as the correct answer, rather than the actual name of the location. This can further increase the challenge/difficulty level of the query, as a fraudulent user might guess that they had gone to All Season Gardening, which may even be shown as one of the options for a multiple-choice question, but the correct answer is another option labeled "My Fave Garden Store". In addition, if it is a fill-in-the-blank question, the fraudulent user might type "All Season Gardening" because they had seen the user enter that store, but they would not type in the "My Fave Garden Store" name because it would not occur to them to enter a made-up name for the merchant.

Figure 6:
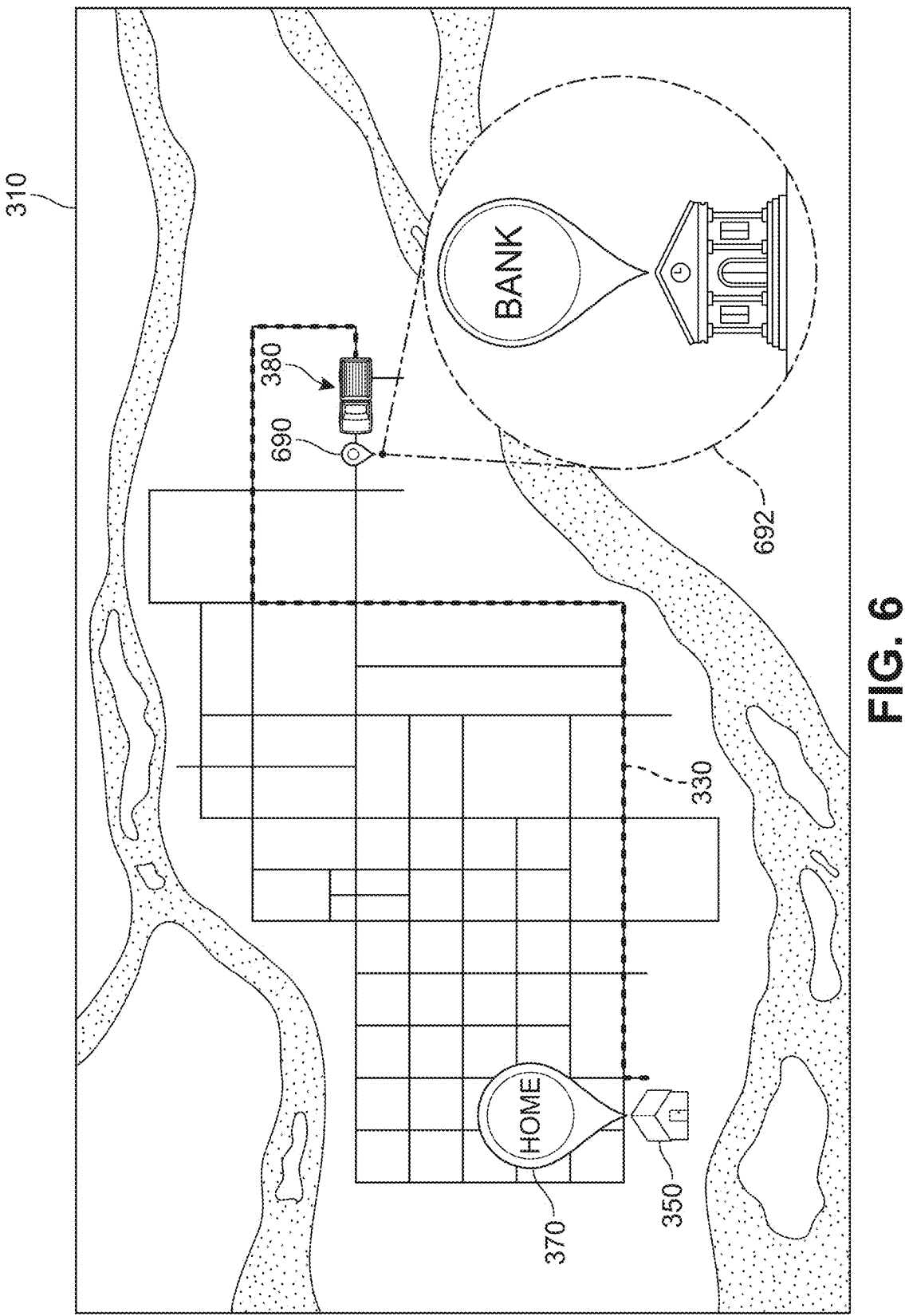
Figure 7:
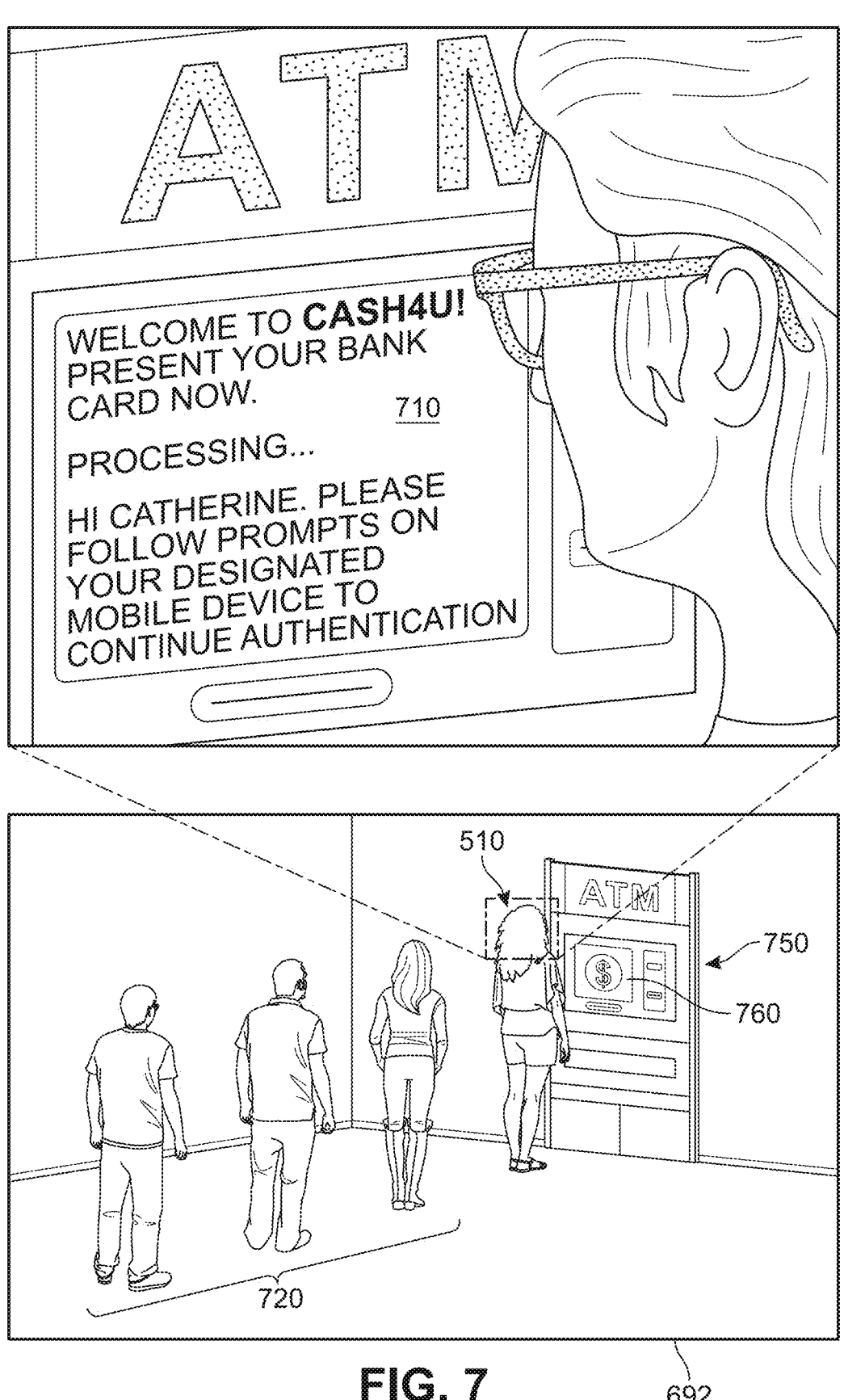
FIGS. 7, 8, 9A, 9B, and 10 depict a scenario in which the user seeks access to funds via an automated teller machine (ATM) and is asked to verify their identity by confirming information about their recent location activity, according to an embodiment.
Figure 8:
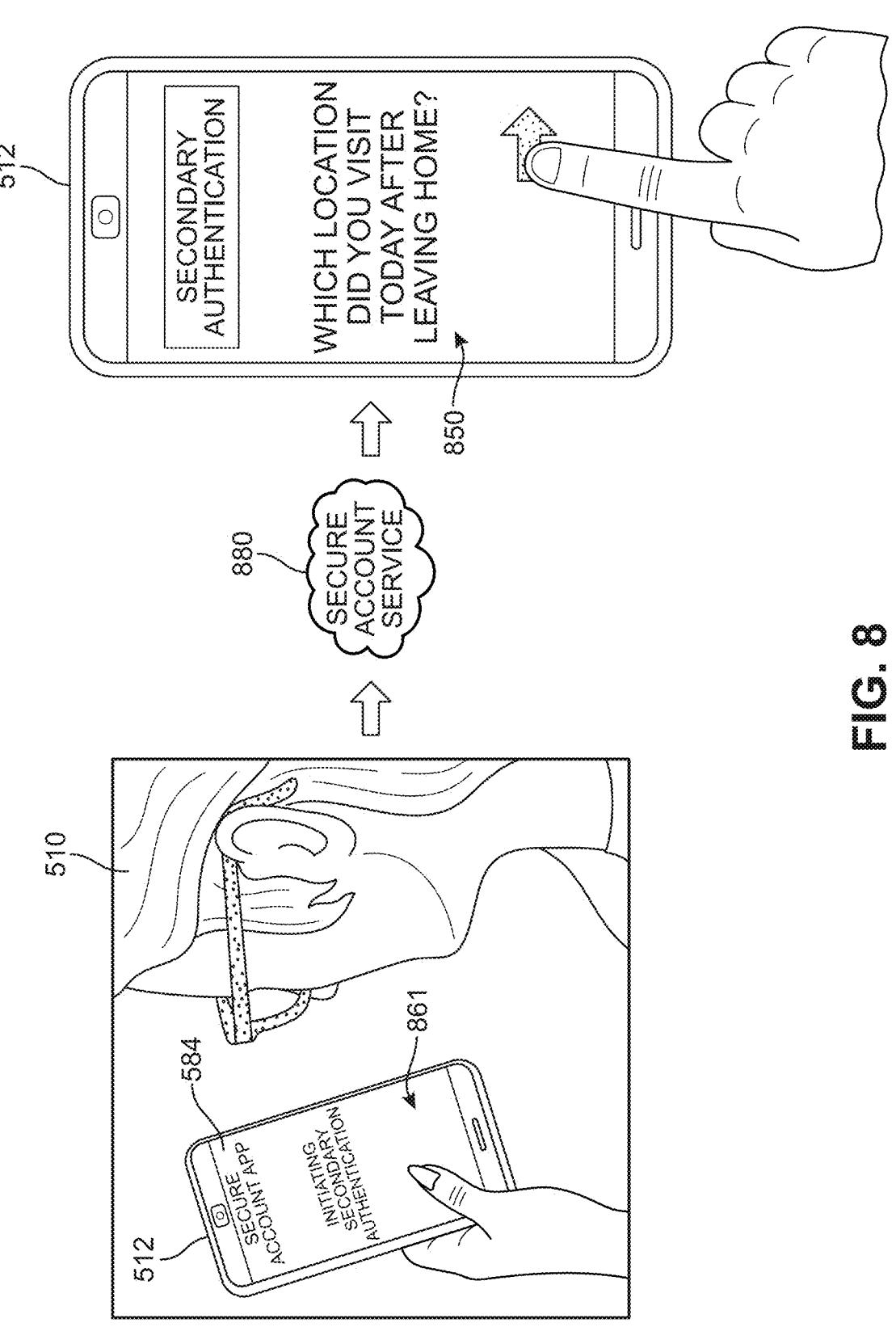

In FIG. 6, the elderly user returns to their vehicle 380 and travels to a third destination 692, which is recorded by the system as third location data 690 and recognized as a bank where the woman has an account. Upon arrival, she joins a queue 720 to access her funds at an automated teller machine (ATM) 750. She approaches a touchscreen display 760, which presents a message 710 following her insertion of a bank card (e.g., "Welcome to Cash4U! Present your bank card now. /Processing . . . /Hi Catherine. Please follow prompts on your designated mobile device to continue authentication"). The elderly woman user 510 turns to her personal mobile device 512, as shown in FIG. 8, and finds the authentication app 584 has opened a new interface 861 for secondary authentication on behalf of the access manager system for ATM 750. The authentication app 584 communicates with authentication system 880 and receives instructions for presenting a first query interface ("first query") 850 via the authentication app 584 that is based on the elderly woman user's recent location data (e.g., see FIGS. 3, 4, and 5): "Which location did you visit today after leaving home?".

Figure 9A:
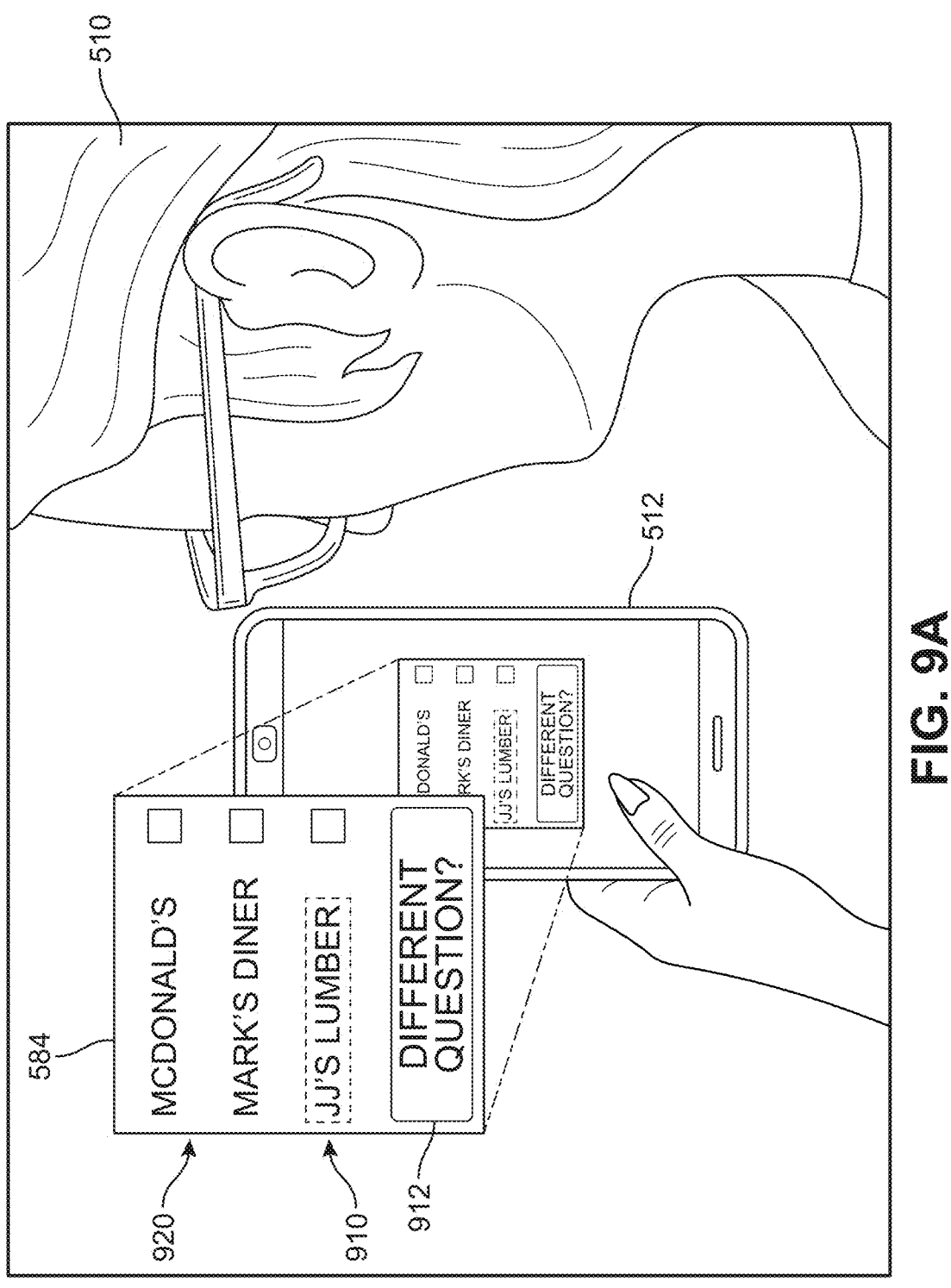
Figure 9B:
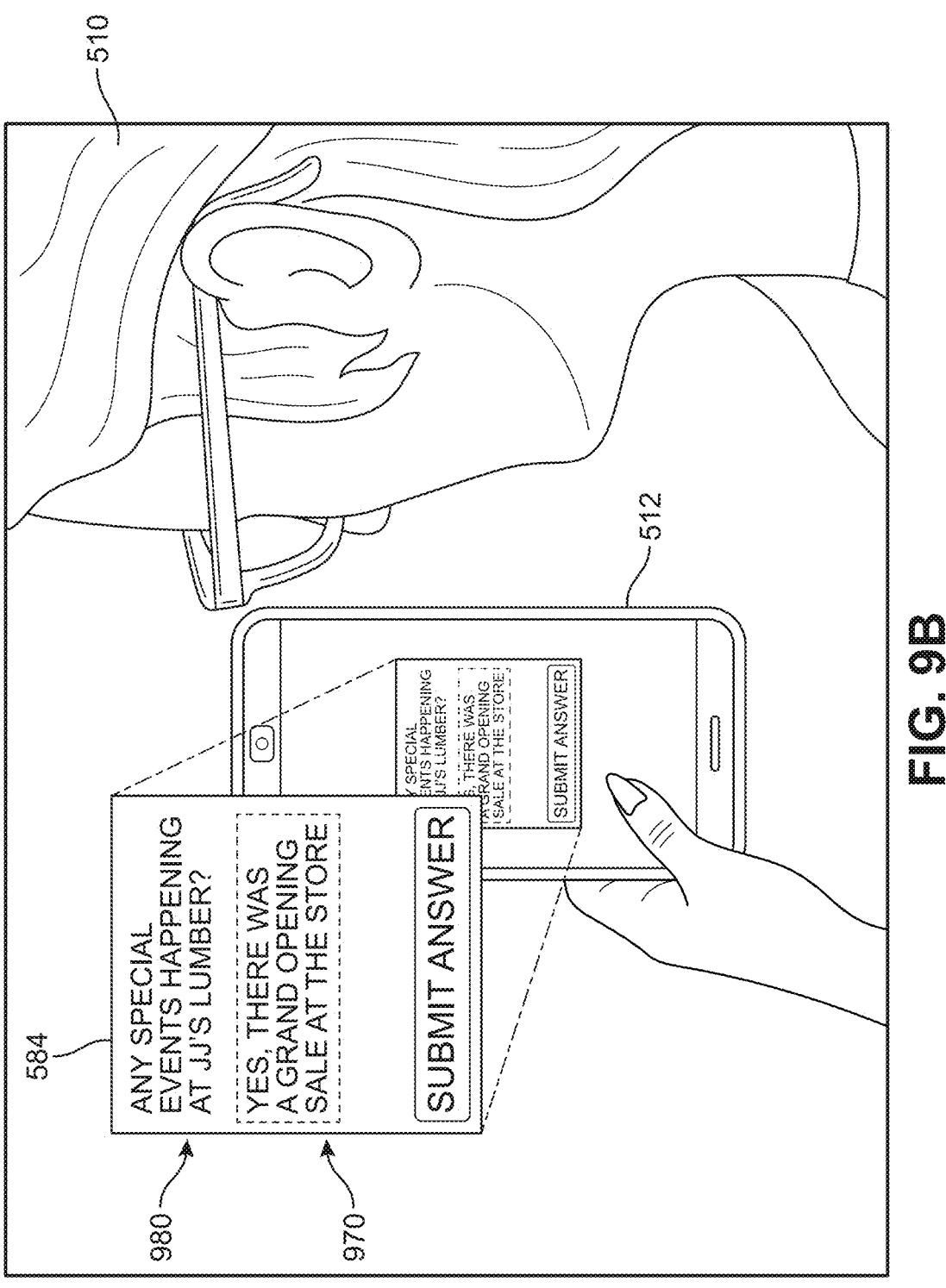
Figure 10:
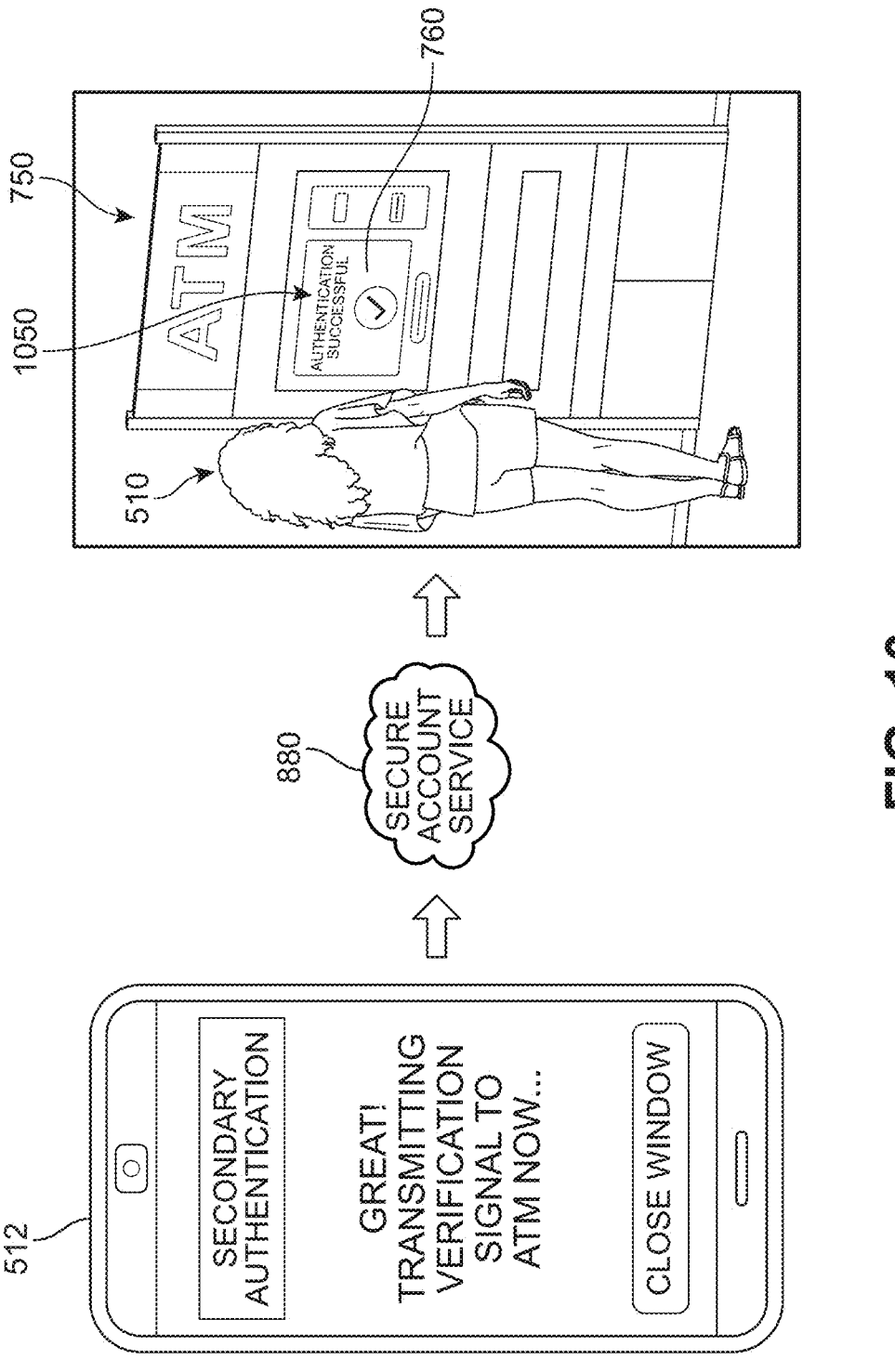

Moving to FIG. 9A, the elderly woman user 510 reviews LLM-generated options 920 (e.g., McDonalds, Mark's Diner, JJ's Lumber) presented on the mobile device 512 and selects a first option 910 corresponding to JJ's Lumber. In some embodiments, the system can offer the user the opportunity to answer a different question 912 in cases where the question is too obscure or they cannot recall the name of a place they visited, and instead redirect them to a new question involving a different location they may have visited recently. In FIG. 9B, a supplemental challenge question 980 can optionally be presented following the standard synthesized query, such as in cases where the level of difficulty was increased due to the ATM/bank being linked a higher-security location, and/or a random application of heightened security. In this case, the question is based on current news/media linked to the place that was visited by the user, as "Any special events happening at JJ's Lumber?". The elderly woman user 510 then taps out a free-form response 970 in a field ("Yes, there was a grand opening sale at the store") and submits the answer. As noted earlier, the responses need not be exact or follow a precise word-format, grammar, or sequence, as the LLM can determine whether the content of the response includes a version of the correct answer. Finally, in FIG. 10, a confirmation message 1020 is optionally shown on the display of the mobile device 512, and the authentication system 880 causes the ATM 750 to provide access and release funds, as represented by a success notification 1050 presented on the screen of the ATM 750.

It should be understood that while the number of options shown in a given query in the drawings is three, this number can differ, and can include two, three, four, five, six, seven, or more options, depending on what can be feasibly displayed to the user via their computing device display. Similarly, the number of queries shown in the drawings— two—is also simply for purposes of illustration, and in other examples, there may be only a single question, or three, four, or more, that can be required of the user before verifying their identity and granting them access.

Figure 11:
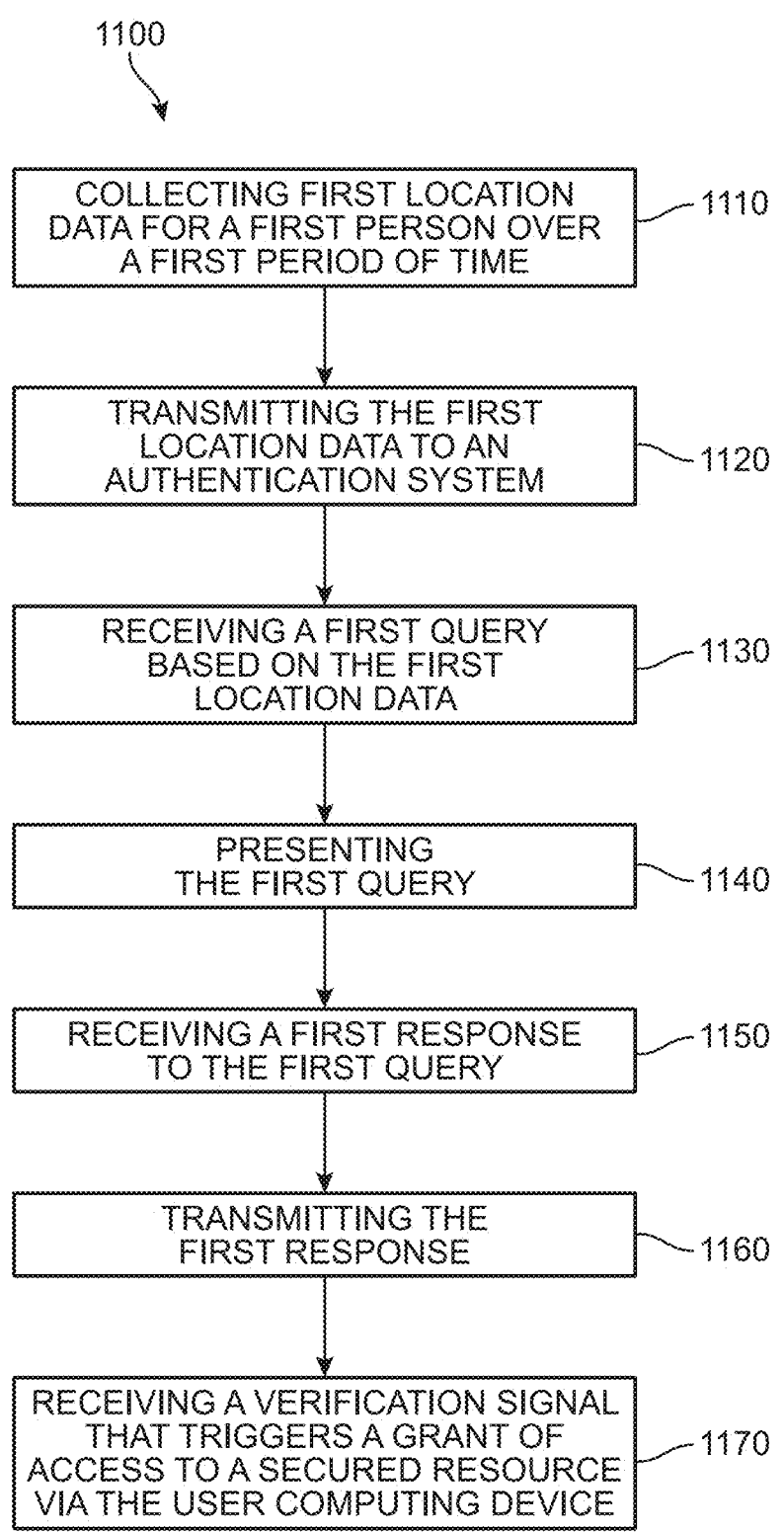
FIG. 11 is a flow chart depicting a process for authentication, according to an embodiment.

FIG. 11 is a flow chart illustrating an embodiment of a computer-implemented method 1100 of authentication for access to a secured resource. The method 1100 includes a first step 1110 of collecting, via an authentication application for a user computing device, first location data for a first person over a first period of time, and a second step 1120 of transmitting, from the authentication application, the first location data to an authentication system. A third step 1130 includes receiving, at the authentication application and from the authentication system, a first query based on the first location data, and a fourth step 1140 includes presenting, via the authentication application, the first query. In addition, a fifth step 1150 includes receiving, at the authentication application and from the first person, a first response to the first query, and a sixth step 1160 includes transmitting, from the authentication application and to the authentication system, the first response. Furthermore, a seventh step 1170 includes receiving, at the authentication application and from the authentication system, a verification signal that triggers a grant of access to a secured resource via the user computing device.

In other embodiments, the method may include additional steps or aspects. In one embodiment, the method also includes receiving, at the authentication system, a first request to access the secured resource; and generating, at the authentication system, the first query in response to the first request. In one example, the first period of time refers to a timespan extending back at least one hour before receiving the first request. In another example, the first query relates to a first place that the first location data indicated was visited by the first person. In some cases, the first query is further based on current events data associated with the first place. In some embodiments, the method also includes generating the first query using a large language model (LLM). In different embodiments, the method further includes generating a correct answer to the first query using a large language model (LLM); determining, via the LLM, the first response is sufficiently similar to the correct answer so as to be classified as a correct response; and generating the verification signal in response to determining the first response is sufficiently similar to the correct answer. In some embodiments, the method also includes selecting a level of difficulty for the first query based on the type of secured resource being accessed or a current location of the first user. In another example, the first query asks the first person the name of the place that was visited by the first person directly before the first request was received.

Other methods can also be contemplated within the scope of this disclosure. For example, a computer-implemented method of authentication for access to a secured resource is also disclosed. The method includes a first step of receiving at a first time, at an authentication system and from an access management system for a secured resource, a request for an authentication factor, and a second step of presenting, in response to the request and via a user computing device carried by a first person, a first query generated by a large language model (LLM) of the authentication system, the first query based on first location data collected by the user computing device. A third step includes receiving, at the authentication system and from the user computing device, a first response to the first query, and a fourth step includes determining, at the authentication system, the first response corresponds to a correct answer. In addition, a fifth step includes authenticating, in response to determining the first response corresponds to the correct answer, the first person, and a sixth step includes transmitting, from the authentication system, a verification signal to the access management system that triggers a grant of access to the secured resource for the first person. In other embodiments, the method may include additional steps or aspects. In one embodiment, the first location data identifies a place the first user visited before the first time. In another example, a level of difficulty associated with the first query is based on the type of secured resource being accessed (e.g., banking, shopping, information).

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANS (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device (s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of authentication, the method comprising:
collecting, via an authentication application for a user computing device, first location data for a first person over a first period of time;
transmitting, from the authentication application, the first location data to an authentication system;
receiving, at the authentication application and from the authentication system, a first query based on the first location data and based on selecting, by a large language model (LLM), a level of difficulty for the first query based on a type of secured resource being accessed;
presenting, via the authentication application, the first query;
receiving, at the authentication application and from the first person, a first response to the first query;
transmitting, from the authentication application and to the authentication system, the first response;
receiving, at the authentication application and from the authentication system, a verification signal that triggers a grant of access to a secured resource via the user computing device;
generating a correct answer to the first query using the LLM;
determining, via the LLM, the first response is within a particular similarity range of the correct answer so as to be classified as a correct response; and
generating the verification signal in response to determining the first response is sufficiently similar to the correct answer.

2. The method of claim 1, further comprising:
receiving, at the authentication system, a first request to access the secured resource; and
generating, at the authentication system, the first query in response to the first request.

3. The method of claim 2, wherein the first period of time refers to a timespan extending back at least one hour before receiving the first request.

4. The method of claim 1, wherein the first query relates to a first place that the first location data indicated was visited by the first person.

5. The method of claim 4, wherein the first query is further based on current events data associated with the first place.

6. The method of claim 1, further comprising determining, via the LLM, whether the inputted response, when spoken aloud, has a similar sound to the correct answer.

7. The method of claim 1, wherein the first query relates to a first place where the first person stopped for longer than a specific duration.

8. The method of claim 1, further comprising selecting a level of difficulty for the first query based on a current location of the first person.

9. The method of claim 2, wherein the first query asks the first person the name of the place that was visited by the first person directly before the first request was received.

10. A method of authentication, the method comprising:
receiving at a first time, at an authentication system and from an access management system for a secured resource, a request for an authentication factor;
presenting, in response to the request and via a user computing device carried by a first person, a first query generated by a large language model (LLM) of the authentication system, the first query based on first location data collected by the user computing device and based on selecting, by a large language model (LLM), a level of difficulty for the first query based on a type of secured resource being accessed;
receiving, at the authentication system and from the user computing device, a first response to the first query;
determining, at the authentication system, the first response corresponds to a correct answer;
authenticating, in response to determining the first response corresponds to the correct answer, the first person;
transmitting, from the authentication system, a verification signal to the access management system that triggers a grant of access to the secured resource for the first person;
generating a correct answer to the first query using the LLM;
determining, via the LLM, the first response is within a particular similarity range of the correct answer so as to be classified as a correct response; and
generating the verification signal in response to determining the first response is sufficiently similar to the correct answer.

11. The method of claim 10, wherein the first location data identifies a place the first person visited before the first time.

12. The method of claim 10, wherein a level of difficulty associated with the first query is based on a current location of the first person.

13. A system for authentication, the system comprising a processor and machine-readable media including instructions which, when executed by the processor, cause the processor to:
collect, via an authentication application for a user computing device, first location data for a first person over a first period of time;
transmit, from the authentication application, the first location data to an authentication system;
receive, at the authentication application and from the authentication system, a first query based on the first location data and based on selecting, by a large language model (LLM), a level of difficulty for the first query based on a type of secured resource being accessed;

present, via the authentication application, the first query;

receive, at the authentication application and from the first person, a first response to the first query;

transmit, from the authentication application and to the authentication system, the first response;

receive, at the authentication application and from the authentication system, a verification signal that triggers a grant of access to a secured resource via the user computing device;

generate a correct answer to the first query using the LLM;

determine, via the LLM, the first response is within a particular similarity range of the correct answer so as to be classified as a correct response; and generate the verification signal in response to determining the first response is sufficiently similar to the correct answer.

14. The system of claim 13, wherein the instructions further cause the processor to:

receive, at the authentication system, a first request to access the secured resource; and generate, at the authentication system, the first query in response to the first request.

15. The system of claim 14, wherein the first period of time refers to a timespan extending back at least one hour before receiving the first request.

16. The system of claim 13, wherein the first query relates to a first place that the first location data indicated was visited by the first person.

17. The system of claim 16, wherein the first query is further based on current events data associated with the first place.

18. The system of claim 13, wherein the instructions further cause the processor to determine, via the LLM, whether the inputted response, when spoken aloud, has a similar sound to the correct answer.

19. The system of claim 13, wherein the first query relates to a first place where the first person stopped for longer than a specific duration.

20. The system of claim 13, wherein the instructions further cause the processor to select a level of difficulty for the first query based on a current location of the first person.

* * * * *